United States Patent
Kuhmann et al.

(10) Patent No.: US 10,246,575 B2
(45) Date of Patent: Apr. 2, 2019

(54) METAL-PLASTIC HYBRID COMPONENT

(71) Applicant: Evonik Degussa GmbH, Essen (DE)

(72) Inventors: Karl Kuhmann, Duelmen (DE);
Maximilian Gruhn, Marl (DE); Olivier Farges, Marl (DE); Martin Risthaus, Olfen (DE); Kathrin Lehmann, Leverkusen (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 15/300,981

(22) PCT Filed: Mar. 31, 2015

(86) PCT No.: PCT/EP2015/057080
§ 371 (c)(1),
(2) Date: Sep. 30, 2016

(87) PCT Pub. No.: WO2015/150409
PCT Pub. Date: Oct. 8, 2015

(65) Prior Publication Data
US 2017/0121503 A1    May 4, 2017

(30) Foreign Application Priority Data
Mar. 31, 2014    (DE) .................. 10 2014 206 022

(51) Int. Cl.
*B32B 27/32*    (2006.01)
*C08K 5/5419*    (2006.01)
(Continued)

(52) U.S. Cl.
CPC .............. *C08K 5/5419* (2013.01); *C08K 3/08* (2013.01); *C08K 5/54* (2013.01); *C08K 7/06* (2013.01);
(Continued)

(58) Field of Classification Search
None
See application file for complete search history.

(56) References Cited

U.S. PATENT DOCUMENTS 3,792,002 A    2/1974  Krieger et al.
3,813,351 A    5/1974  Thomson
(Continued)

FOREIGN PATENT DOCUMENTS

CN    1665861 A    9/2005
DE    2118796 A1    11/1972
(Continued)

OTHER PUBLICATIONS

International Search Report dated Jul. 2, 2015 in PCT/EP2015/057080 filed Mar. 31, 2015.

*Primary Examiner* — Maria V Ewald
*Assistant Examiner* — Zachary M Davis
(74) *Attorney, Agent, or Firm* — Grüneberg and Myers PLLC

(57) ABSTRACT

The invention relates to a polymer composition, and to a semifinished plastics product, the surface of which has been formed at least to some extent from the polymer composition. The invention further relates to a production process associated therewith for the semifinished plastics product. A feature of the polymer composition is that it comprises from 50 to 99.7% by weight of a polymer and from 0.3 to 20% by weight of one or more adhesion-promoting additives. The invention further relates to plastics-metal hybrid components and production of these.

22 Claims, 1 Drawing Sheet

(51) Int. Cl.

| | | |
|---|---|---|
| *C08K 5/54* | (2006.01) | |
| *C08K 7/06* | (2006.01) | |
| *C08K 7/14* | (2006.01) | |
| *C08L 71/00* | (2006.01) | |
| *C08L 77/02* | (2006.01) | |
| *C08L 77/06* | (2006.01) | |
| *C08L 71/08* | (2006.01) | |
| *C08K 3/08* | (2006.01) | |

(52) U.S. Cl.
CPC ............... *C08K 7/14* (2013.01); *C08L 71/00* (2013.01); *C08L 71/08* (2013.01); *C08L 77/02* (2013.01); *C08L 77/06* (2013.01); *C08G 2650/40* (2013.01)

(56) References Cited

U.S. PATENT DOCUMENTS

| | | | |
|---|---|---|---|
| 4,141,869 A | | 2/1979 | Hoss et al. |
| 4,921,889 A | * | 5/1990 | Lausberg ............... C08L 71/00 523/400 |
| 5,714,550 A | * | 2/1998 | Shaw ....................... C08K 3/38 524/188 |
| 6,875,824 B2 | * | 4/2005 | Fishburn ............... C08L 71/12 524/115 |
| 7,951,260 B2 | | 5/2011 | Risthaus et al. |
| 8,153,269 B2 | | 4/2012 | Risthaus et al. |
| 9,205,630 B2 | | 12/2015 | Pawlik et al. |
| 2007/0163709 A1 | | 7/2007 | Risthaus et al. |
| 2007/0190306 A1 | | 8/2007 | Herrwerth et al. |
| 2007/0287765 A1 | | 12/2007 | Busch et al. |
| 2011/0143142 A1 | | 6/2011 | Risthaus et al. |
| 2012/0070670 A1 | | 3/2012 | Pawlik et al. |
| 2012/0282210 A1 | | 11/2012 | Henning et al. |
| 2015/0282566 A1 | | 3/2015 | Gruhn et al. |
| 2015/0361304 A1 | | 7/2015 | Gruhn et al. |
| 2015/0361316 A1 | | 7/2015 | Henkenjohann et al. |
| 2017/0015826 A1 | | 1/2017 | Klemt et al. |

FOREIGN PATENT DOCUMENTS

| | | |
|---|---|---|
| DE | 35 45 032 C1 | 1/1990 |
| EP | 1 808 468 A2 | 7/2007 |
| EP | 1 808 468 A3 | 7/2007 |
| EP | 1 820 832 A1 | 8/2007 |
| EP | 1 900 786 A1 | 3/2008 |
| GB | 2 187 464 A | 9/1987 |
| JP | 52-47832 A | 4/1977 |
| JP | 62-220523 A | 9/1987 |
| JP | 6-200151 A | 7/1994 |
| JP | 2006-297927 A | 11/2006 |
| JP | 2007-518869 A | 7/2007 |
| JP | 2013-518945 A | 5/2013 |
| KR | 10-2012-00718777 A | 3/2012 |
| WO | 2010/136241 A1 | 12/2010 |
| WO | 2013/102590 A1 | 7/2013 |

* cited by examiner

METAL-PLASTIC HYBRID COMPONENT

BACKGROUND OF THE INVENTION

Field of the Invention

The present invention relates to a polymer composition, to a foil, to a semifinished plastics product, to a process for the production of a semifinished plastics product, to a hybrid component, and also to a process for the production of hybrid components.

Discussion of the Background

Hybrid components (or structural components) are composites of two materials: metal and plastic. They can be produced by way of example by the injection-moulding process. In this process a metal insert part is inserted into a mould, and the plastics component is moulded by way of example by using pressure and heat by the injection-moulding or compression-moulding process. This gives a hybrid component with metal regions and plastics regions.

Hybrid components are components used inter alia in vehicle construction and in aircraft construction and also in electronics and electrical engineering in the field of load-bearing parts and of parts that absorb forces, or as part of a housing, for example for decorative purposes. A particular feature of these is that they comprise local reinforcement systems which give the component particular mechanical properties and/or provide the possibility of functional integration. A feature requiring particular emphasis is increased component stiffness with additional weight reduction in comparison with components hitherto used in a conventional mode of construction.

The abovementioned application sectors increasingly use hybrid components in order to reduce mass and at the same time obtain optimized mechanical properties. The disadvantage of these hybrid components is lack of, or inadequate, adhesion between metal and plastic. Mechanical methods have therefore hitherto been used to anchor the plastic to the metal.

Adhesion between metal and plastic can be improved by using adhesion promoters. EP-A-1808468 and EP-A-2435246 disclose hybrid components where the bond between metal and plastic uses hot-melt adhesives in the form of copolyamide-based adhesion promoters additionally comprising isocyanate groups and epoxy groups.

In particular in the automobile sector there are known metal substrates which comprise conversion coats, these being used for surface treatment. The coats are produced on the surface by way of example by a phosphating or chromating process.

The adhesion between metal and plastic in the hybrid components of the prior art is not yet adequate to comply with mass-production requirements, for example in the automobile sector: the hybrid components are provided during processing by way of example with cathodic electrodeposition coatings, and also basecoats and/or clearcoats. The hybrid components here are exposed to various conditions, for example acid, pressure, or heat. The consequence is frequently reduced adhesion between metal and plastic, extending as far as total adhesion loss. The inadequate adhesion is associated by way of example with the incompatibility between many plastics and various metals, or the varying chemical and physical nature of the substrate surfaces resulting from oxidation and corrosion processes due to natural or other environmental effects.

SUMMARY OF THE INVENTION

The object therefore consisted in providing a composition in the form of adhesion promoter between plastic and metal, where the adhesion promoter does not have the disadvantages of the prior art. Accordingly, the intention was that the hybrid components comprising the composition have, in comparison with the prior art, improved or increased adhesion between metal and plastic. A further intention was that the resultant hybrid components comply with the requirements of vehicle construction and of aircraft construction, and also those of the electronics industry and electrical-engineering industry. A further intention was to provide good weathering resistance, in particular corrosion resistance. The intention is that there be at least some coherent bonding between metal and plastic in the hybrid component. A further intention was that the compositions have, in comparison with the compositions functioning as adhesion promoters in the prior art, lower water absorption and improved low-temperature impact resistance.

Another intention was that the composition be suitable for use as constituent of the plastic in a plastic-metal hybrid component, for promoting adhesion.

Accordingly, a polymer composition of the type mentioned in the introduction has been found, and it is thus possible to provide hybrid components which have improved adhesion between metal and plastic. The composition of the invention comprises a) from 50 to 99.7% by weight, preferably from 60 to 99.5% by weight and with preference from 75 to 99.5% by weight of at least one polymer selected from polyamides, mixtures of these and polyaryl ether ketones, and b) from 0.3 to 20% by weight, preferably from 0.5 to 20% by weight of one or more additives of the formula (I):

Where $M=[R_3SiO_{1/2}]$ $M'=[R'R_2SiO_{1/2}]$ $D=[R_2SiO_{2/2}]$ $D'=[R'RSiO_{2/2}]$ where each R is selected mutually independently from the group consisting of H, alkyl moieties having from 1 to 12 C atoms and a phenyl moiety, and R' is preferably selected mutually independently from one or more moieties of the formulae (II), (III) or (IV), where (II) is an alkylamino moiety

where x=from 1 to 20 and R" is selected from H and an alkyl moiety having from 1 to 12 C atoms, (III) is a (trialkoxysilyl)methylene moiety

in which R''' is an alkyl moiety having from 1 to 4 C atoms, and (IV) is an epoxycyclohexylalkyl moiety

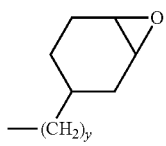

(IV)

where y=from 1 to 4, preferably y=from 2 to 4, with preference 2 or 3, particularly preferably 2,
where the definitions of the indices are as follows:
a=from 0 to 2
b=from 0 to 2
c=from 10 to 500
d=from 0 to 50
a+b=2 and
b+d≥2,
and where the proportions of all of the constituents of the composition give a total of 100% by weight. The additive has adhesion-promoting effect ("adhesion-promoting additive"). The moiety (IV) can also be termed 7-oxabicyclo[4.1.0]heptan-3-ylalkylene group in accordance with IUPAC nomenclature. The stated structures (II), (III) and (IV) are definitive.

DETAILED DESCRIPTION OF THE PREFERRED EMBODIMENTS

Figure 1:
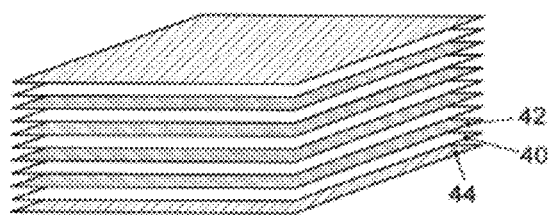
FIG. 1 exemplifies a sequence of a semifinished fibre-composite product.

The moiety R' can be selected mutually independently from a plurality of the moieties of the formulae (II), (III) and (IV). Preference is given here to additives (I) which comprise a mixture of the moieties (II) and (IV) or (III) and (IV), particular preference being given here to mixtures of the moieties (III) and (IV). The molar ratio of the moieties (II):(IV) and (III):(IV) is preferably in the range from 1:10 to 10:1, preference being given here to an excess of (IV).

It is preferable that the moiety R is a methyl or phenyl moiety.

The moieties of the formulae (II) and (III) can have statistical distribution in the additive of the formula (I). Statistical distributions can have a block structure with any desired number of blocks following one another in any desired sequence, or they can have a randomized distribution, and they can also have an alternating structure, or else can form a gradient along the polymer chain, and in particular they can also consist of any of the mixed forms where groups of different distributions can optionally follow one another. The statistical distributions can be subject to restrictions resulting from specific embodiments. Wherever the restriction does not apply, there is no change to the statistical distribution.

In one preferred embodiment of the invention, the ratio of the sum of the indices a+c to the sum of the indices b+d, (a+c)/(b+d), is in the range from 2 to 50, in particular in the range from 4 to 20, particularly preferably in the range from 5 to 15. An excessively small proportion of the moiety R' leads to inadequate coherent bonding to the surface of the metallic substrate. On the other hand, excessive proportions make it more difficult to process the additive to give the polymer composition, and substantially complicate the synthesis of these additives.

The definition of index c is preferably c=from 15 to 100, and with preference c=from 20 to 50. The following definition is moreover preferable:
(i) In the event that b=2, the definition of index d is: d=from 0 to 20, in particular d=from 1 to 10; and
(ii) In the event that b=0, the definition of index d is: d=from 2 to 20, in particular d=from 3 to 10. The definitions mentioned allow optimization of the properties of the additive with respect to the polyamide matrix and to subsequent further processing of the polymer composition, for example to give a foil.

The polymer composition preferably comprises from 0.5 to 10% by weight, and with preference from 1 to 5% by weight, of the additive of the formula (I). In the event of excessively small additive concentration, the adhesive effect is inadequate. On the other hand, excessively high additive concentrations have an adverse effect on the mechanical, thermal and rheological properties of the polymer (viscosity rises, coefficient of thermal expansion increases, self-cross-linking of the additive, agglomeration).

The additives of the formula (I) and the production of these are known for example from US 2007/287765 A1 and US 2007/190306 A1.

The polymers of the polymer composition of the invention can have reinforcement, for example fibre-reinforcement, preference being given here to polymers reinforced by glass fibres (GF) or by carbon fibres (CF). To the extent that the composition functions as adhesion-promoter layer between metal and plastic, the composition preferably comprises no fibres.

Polyamides are preferred polymers of the polymer composition of the invention. The polyamide is preferably selected from the group comprising homopolyamides of aminocarboxylic acid type, homopolyamides of diamine-dicarboxylic acid type, copolyamides and mixtures thereof. The polyamide can be aliphatic or semiaromatic.

Other Constituents

The compositions of the invention can comprise additional substances. These serve by way of example for better processing of the polymer composition, or for colouring or for establishing other properties of the material. The polymer composition can comprise fillers, such as talc powder or chalk, but it is preferable that the composition comprises no fillers. The composition can moreover comprise additional substances such as stabilizers, impact modifiers, flow aids and pigments. Organic solvents can moreover be present. Total proportions that can be present of additional substances of this type are from 0 to 20% by weight, preferably from 0 to 10% by weight.

Production of Composition

It is preferable to produce the polymer composition from the individual constituents via mixing in the melt in a kneading unit. The adhesion-promoting additive, and optionally other additional substances, can respectively be added individually or together in the form of a mixture, directly to the polymer pellets or to the polymer melt. Where appropriate, the polymer composition is produced from the individual components only shortly prior to further processing; by way of example, an extruder of a foil-production plant may be used for this purpose. It is equally possible to add the components as a mixture in the form of a masterbatch.

The adhesion-promoting additives used, the viscosity of which is generally from 10 to 10 000 mPas (Brookfield RV-DV II+ Pro, RV3 spindle, 100 rpm, 21° C.), can be added to the polyamide by using a liquid-metering system during the production of the polymer composition, or the additives can be provided as masterbatch in solid form. Preference is given to the latter, since the processing of liquid components in extruders involves technical complications, particularly when concentrations are above 10%.

Foil

The invention further provides a foil comprising the composition of the invention. The average thickness of the foil is preferably from 10 μm to 700 μm, with preference from 10 μm to 600 μm.

Various processes can be used for the production of foils made of the polymer composition of the invention:

In the case of casting processes, the polymer composition is plastified in an extruder (mostly single-screw extruder) and cast by way of a slot die onto a rotating water-cooled roll; this method can produce foils with layer thicknesses from 25 to 700 μm, with preference from 25 μm to 600 μm at high production speed.

In the case of the blown-film process, the extrudate is likewise plastified in an extruder (mostly single-screw extruder) and an annular vertical die is used, with the aid of an airstream, to produce a melt bubble of the polymer composition, which is then cooled in the airstream. The usual thicknesses are from 10 to 500 μm.

The thickness of the foils of the invention is preferably from 10 μm to 700 μm, with preference from 10 μm to 600 μm, preferably from 15 μm to 500 μm, more preferably from 20 μm to 400 μm, still more preferably from 30 μm to 300 μm, yet more preferably from 50 to 200 μm and with particular preference from 75 to 150 μm. According to the prior art it is possible to use various methods to determine the thickness of the foils, one example being mechanical methods such as those using micrometer screw gauges, another example being optical methods using interference measurements. It is preferable to determine the thickness of the foils of the invention by using micrometer screw gauges, by way of example micrometer screw gauges from Mituyo, particularly preferably of calliper screw gauge type, with particular preference using a screw closure force of from 7 to 9 Newtons. This closure force avoids damage to the foil, thus ensuring that the values measured are highly reproducible.

It is preferable that foils of the invention have, at the surface layer, zones of increased-concentration of the adhesion-promoting additives according to formula (I). The occurrence of this effect can be dependent on the selected additive of the formula (I). The person skilled in the art can use preliminary experiments to select a suitable additive, and it is possible here to vary the chain length, the moieties (II) to (IV), the proportion of the additives in the polymer composition, and the nature and number of the substituents.

Figure 3:
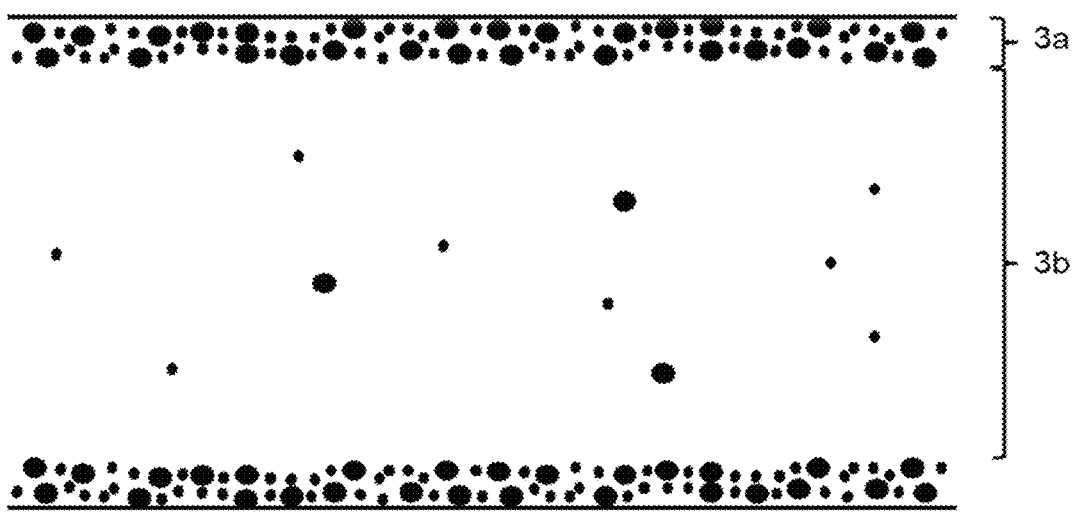
FIG. 3 is an X-ray photoelectron spectrograph of a composite product.

There is thus an increase in the concentration of the adhesion-promoting additives in the surface layers (3a) in comparison with the bulk (3b) (cf. FIG. 3). X-ray photoelectron spectroscopy (XPS) is used for the determination of increased-concentration zones of this type. This method permits element-dependent determination of concentration in surface layers, the result obtained being a concentration/depth profile for the element silicon.

Foils with increased-concentration zones are very advantageous because they allow lowering of the concentration of the adhesion-promoting additive, this being the foil component that drives cost.

It is preferable that the concentration of the adhesion-promoting additives in the increased-concentration zones is at least 3 times, preferably at least 4 times, more preferably at least 5 times, still more preferably at least 6 times, even more preferably at least 7 times, 8 times or 9 times, and in particular at least 10 times, greater than in the bulk.

It is preferable that the foils of the invention have increased-concentration zones with layer thickness from 0.1 to 4000 nm, preferably from 0.5 to 400 nm, more preferably from 1 to 100 nm, still more preferably from 2 to 50 nm, particularly preferably from 2.5 to 20 nm and with particular preference from 3 to 10 nm.

Preference is in particular given to foils where the thickness of the increased-concentration zone is from 2 to 20 nm and where the increased concentration is at least 5 times greater than the bulk concentration.

There is no requirement that the foils of the invention be clear; they can have a cloudy or opaque appearance. These optical properties are not a criterion of quality.

The processes can also manufacture multilayer foils. In this case at least one of the exterior layers of the multilayer foil is composed of the polymer composition of the invention. Examples of possible layer formations are therefore the following:
1. Layer=polymer composition of the invention composed of a polymer and of at least one adhesion-promoting additive
2. Layer=polymer without adhesion-promoting additive
3. Layer=polymer composition of the invention composed of a polymer and of at least one adhesion-promoting additive.

The arrangement can have a plurality of the layer without adhesion-promoting additive, mutually superposed.

Semifinished Plastics Product

A semifinished plastics product can be produced from the additive-modified polymer of the polymer composition of the invention by using known processes (an example being melt impregnation, foil impregnation or powder impregnation in the twin-belt press process, interval hot pressing).

Another possibility for the production of an edge-layer-modified semifinished fibre-composite product without prior foil production is the twin-belt press process. Here, one or more layers of a dry (not impregnated) continuous-filament-fibre-reinforced semifinished fibre-composite product is introduced into a twin-belt press. In the interstitial region between the individual layers—by analogy with the direct melt process—it is preferable that the matrix material is applied by way of a slot die to the dry textile.

Semifinished products also encompass conventional mouldings which by way of example are obtainable by moulding processes such as injection moulding, compression moulding or extrusion.

The semifinished plastics product is also provided by the invention. The semifinished product comprises at least one polymer selected from polyamides, mixtures of these and polyaryl ether ketones (plastics material). At least a part of the surface of the semifinished plastics product is coated or impregnated with at least one polymer composition of the invention.

It is sufficient here that the semifinished product has been coated with compositions of the invention only at the surface regions intended for coherent bonding to a metallic component. There is accordingly no requirement that the composition be present either in the entire volume of the semifinished plastics product or in the entire region close to the surface.

It is preferable that the polyamide is selected from the group comprising homopolyamides of the aminocarboxylic acid type, homopolyamides of the diamine-dicarboxylic acid type, copolyamides and mixtures thereof. The polyamide can be aliphatic or semiaromatic.

The plastics material and the polymer of the polymer composition can be identical or different. It is preferable that the polymers are identical or are based on the same monomers. It is preferable that the plastics material and the polymer of the composition are polyamides, with preference being a homopolyamide. The plastics material can therefore comprise the additive of the formula (I).

The plastics material preferably has fibre-reinforcement (fibre-reinforced polymer), thus allowing use of the term semifinished fibre-composite product for the semifinished plastics product. It is preferable that at least one external layer of the semifinished fibre-composite product comprises the adhesion-promoting additive. In so far as only the external layer(s) comprise(s) the additive, it is preferable that the dry layer thicknesses are from 10 to 50% higher than those of the layers that do not comprise the additive. It is preferable that the compositions of the invention are applied in the form of a foil or as powder for the production of the semifinished fibre-composite products. The powder here should have sufficient fineness, but the absolute median particle size distribution in the form of the d50 value is not so very definitive here. In a first step the material can be ground by using an impact mill from Retsch, DE, thus already providing, by way of a 100 µm, 200 µm or 500 µm sieve, the main fraction of the powder with sufficient fineness; it is then only necessary to use actual sieving to remove small quantities of coarse fractions. The sieving of the milled powder can take place subsequently, by way of example in that the coarse fraction starting at 250 µm is removed in order to obtain the finer particles as main fraction. It is even more preferable to remove the particles above 150 µm, and in particular it is preferable to use only particles measuring less than 100 µm. The powder is thus processed through manual agitation or by way of what is known as a sieve stack, and the fine fractions are isolated for further processing. Suitable metallic sieves are available by way of example from Retsch as Test Sieve with a desired mesh width.

The fibre-reinforced polymers comprise dimensionally stabilizing fibres comprising synthetic fibres, carbon fibres or glass fibres, particular preference being given here to glass fibres (GF) or carbon fibres (CF), and particular preference being given here to glass fibres. The dimensionally stabilizing fibres are individual fibres or fibre composites which can have been processed to give woven fabrics or to give layers with different orientation of the fibres; this can by way of example be achieved via winding of individual fibres or fibre strands, e.g. fibre bundles.

The fibres can be divided as follows according to fibre length:

The length of short fibres is about 0.1 to 1 mm. The term long fibres is used for fibres with length about 1 to 50 mm. The term continuous fibres is used when the length is more than 50 mm. Length is defined as the number-average fibre length in the matrix after production of the fibre-composite material in accordance with DIN ISO 22314. Fibres of this type can be present in the fibre-reinforced polymers.

The polymer composition of the invention can comprise from 0 to 49.7% by weight of fibres, based on the total weight of the polymer composition. The quantity of fibres present is preferably from 0 to 40% by weight and preferably from 0 to 30% by weight. A fibre-containing composition can comprise at least 10% by weight of fibres, and preferably at least 25% by weight.

The thickness of the plastics materials can be from 0.1 to 10 mm, preferably from 0.5 to 10 mm, with preference from 0.7 to 8 mm, especially preferably from 1.0 to 6 mm.

Finally, another aspect of the invention is directed to a process for the production of this type of semifinished plastics product. The process comprises the following steps:
a) Provision of a plastics material;
b) Application of at least one layer of the polymer composition of the invention.

The compositions can be applied continuously or batchwise by means of electrophoretic enameling, electrostatic spray processes, fluidized-bed sintering, roll processes (for example coil coating), casting, jet processes, injection moulding and spraying, lamination, (hot) pressing, or (co)extrusion (for example in the form of foil), preference being given here to spray processes and application processes using rolls, and also to the foil application process. The compositions of the invention here can be applied on one or both sides, locally or over an entire area. The dry layer thicknesses of the compositions can be from 10 to 1000 µm, preferably from 20 to 250 µm, and with preference from 30 to 150 µm. Preferred layer thicknesses in roll processes are from 5 µm to 250 µm, in particular from 10 µm to 50 µm.

Accordingly, the composition of the invention may by way of example be applied as a powder or as a foil or in the form of aqueous or solvent-based coatings.

To the extent that the composition is applied in the form of foil, the foil is preferably processed in the manufacturing process for the semifinished plastics product by the film-stacking process or by the direct melt process or by lamination, preference being given here to lamination. Use can be made here of known foil-production processes, such as the foil-casting process or the foil-blowing process. The thickness of the foil is preferably in the range from 10 µm to 700 µm, more preferably from 10 µm to 600 µm, more preferably from 30 to 300 µm and with particular preference from 50 to 150 µm. The polymer composition of the invention has excellent suitability for foil production.

According to one variant, the foil here can be applied via lamination directly to a preform of the semifinished plastics product.

In the film-stacking process here, mutually superposed webs of fibre material (by way of example fabrics, woven fabric, nonwoven) and of polymeric matrix material (by way of example in the form of a foil) are continuously introduced into a heated mould, known as the impregnation unit, and thermally fused. At least one of the two exterior webs here is a layer, by way of example a foil, which has been produced from the polymer composition of the invention.

FIG. 1 shows an example of a sequence of the type that can be used for the production of a semifinished fibre-composite product by the film-stacking process, comprising alternating layers of the various materials. They comprise layers made of matrix foil 40, for example made of polyamide and, arranged in alternation between the matrix foils 40, layers of a semifinished reinforcement product 42. The semifinished reinforcement product 42 includes the fibres serving for reinforcement. Examples of possible types of fibre here are glass fibres, carbon fibres and aramid fibres. Possible types of semifinished reinforcement product comprise laid scrims and woven fabrics. Finally, a respective modified edge foil 44 made of the polymer composition of the invention can be provided in the external region (edge region) of the layer stack depicted (edge-layer-modified).

Again, in what is known as the direct melt process at least one of the external webs is a foil of the polymer composition of the invention. In the case of this process variant, the polymeric matrix which finally surrounds the fibres is introduced in the form of melt directly into the temperature-controlled mould of the impregnation unit. The process can also be used for powders.

Figure 2:
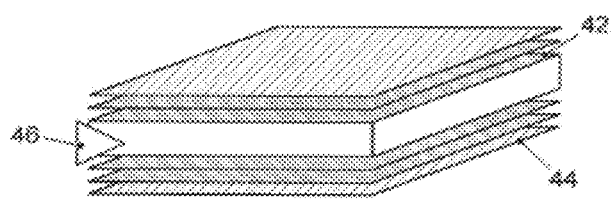
FIG. 2 exemplifies a sequence of a semifinished fibre-composite product.

In the direct melt process, layers made of semifinished reinforcement product 42 and of modified edge foil 44 are introduced in the sequence depicted in FIG. 2 into the interval press unit. A plastics melt 46 made of polyamide is moreover introduced by way of a plastifying unit.

The build-up depicted in FIGS. 1 and 2, in particular the layer sequence and the number of the layers made of semifinished reinforcement product 42 and matrix foil 40, is variable and can be adapted to the respective requirements. For the purposes of the invention, it is important that an edge-layer modification of the semifinished fibre-composite product is achieved on one or both sides by lamination with the modified edge foil 44 made of the polymer composition of the invention.

This is followed, where appropriate, by other process subsections for the production of the ready-to-use semifinished plastics product, an example being trimming or optionally a preforming process and the like.

Hybrid Components

A first embodiment of a plastic-metal hybrid component of the invention comprises at least one metal and at least one polymer composition of the invention. The composition of the invention functions here as plastic of the hybrid component. In this embodiment the additive of the formula (I) is integrated in the plastic of the hybrid component.

A second embodiment of a plastic-metal hybrid component of the invention comprises at least one metal and at least one semifinished plastics product of the invention. The semifinished plastics product is characterized by at least one, preferably one, coating of the polymer composition of the invention, which functions as adhesion promoter between semifinished plastics product and metal.

A third embodiment of a plastic-metal hybrid component of the invention comprises at least one metal coated with the polymer composition of the invention, which functions as adhesion promoter between semifinished plastics product and metal, and a plastics material comprising a polymer selected from polyamides, mixtures of these and polyaryl ether ketones.

The polymer composition of the invention as plastic of the hybrid component, the plastics material without any composition of the invention and the semifinished plastics product of the hybrid component are covered by the expression plastics component of the hybrid component.

The metallic substrate of a hybrid component is bonded coherently to the plastics component by using the adhesion-promoting additive. The plastics component can then be subjected to a forming process and/or pressed onto a metal or a semifinished metallic product by means of thermoplastics-pressing process. The process is also provided by the invention.

In the first or third embodiment of a plastic-metal hybrid component of the invention it is moreover possible to apply the plastics component, by way of example the polymer composition, to the metal by an injection-moulding or extrusion process or by hot pressing, and to bond the metal physically and/or chemically to the composition.

In the second embodiment, the semifinished plastics product may be provided and joined by way of customary processes such as hot pressing, welding or stamping.

The combination of metal and plastic can then be subjected to a heat treatment (heat conditioning) for from 5 min to 70 min, preferably from 10 min to 60 min, at from 120° C. to 230° C., preferably from 150° C. to 230° C., in order to increase bond strength and degree of crosslinking. A coherent bond between the composition and the metal is thus achieved. Hybrid components obtained in this way have durable bonding between the metal, which may have been precoated, and the plastic, and exhibit high mechanical and dynamic strength. The compositions are thus cured thermally. The invention also provides this process.

The stated temperatures are to be set so as to avoid decomposition of the materials used. The person skilled in the art can use simple preliminary tests for this purpose.

The materials of the plastics component and of the metal have been bonded to one another at least to some extent by the coating of a composition.

There can moreover be a further layer of the composition of the invention introduced as adhesion promoter between the plastics component and the metal.

The hybrid components of the invention can moreover have been bonded to one or more materials C. The other materials C can have been bonded to the hybrid components of the invention by means of an interlocking, frictional or coherent bond, and it is optionally possible here to use a composition of the invention or a hot-melt adhesive based on copolyamide as adhesion promoter.

The material C can be selected from plastics, metals, ceramic compositions, wood, glass, composite materials, textile fibres and finished products produced from textile fibres. Preferred materials C are plastics, metals and fibre-composite materials.

The invention further provides a process for the production of the hybrid components described above. Here, the metal is bonded coherently as described above to the plastics component.

To the extent that a material C is used for the production of an extended hybrid component, it is possible to begin by producing a hybrid component. The material C can then be applied to, or placed onto, the hybrid component and bonded to the hybrid component. Alternatively, the material C, the metal and the plastics component can be bonded together (in one step) for the production of the extended hybrid component.

During the production of the hybrid component or of the extended hybrid component it is possible to combine various manufacturing steps such as moulding or forming processes, or machining, and to carry out these in a single process step (integrated manufacture).

The invention further provides the use of the polymer composition of the invention as adhesion promoter, in particular for semifinished plastics products. The composition can moreover be used as adhesion promoter for hybrid components comprising metal and the polymer composition as plastics component, or metal and a semifinished plastics product. The polymer composition can moreover be used in foil form (as foil).

The hybrid components of the invention are used by way of example in mechanical engineering and plant engineering, vehicle construction, the airline industry, in railway engineering, in electronics or electrical engineering. Typical applications are in the field of automobile interiors, of bumpers, of loadbearing bodywork structures, as frame parts and bodywork parts such as front-end members, door components, roof components, floor components or chassis components, or as electronics housing. Equally suitable application sectors are frames, profiles, façade elements or guide strips for windows and doors in the field of house construction and architecture.

Homopolyamides

Preferred polyamides (PA) of the polymer composition and of the fibre-composite material are selected from the group consisting of nylon-6, nylon-6,6, nylon-6,10, nylon-6-12, nylon-6,13, nylon-6,14, nylon-10,6, nylon-10,10, nylon-10,12, nylon-12,12, nylon-11, nylon-12, polyphthalamides and mixtures based on these polyamides. Particularly preferred polyamides are selected from nylon-6, nylon-6,6, nylon-6,10, nylon-6,12, nylon-10,10, nylon-12, and mixtures of these.

Among homopolyamides there are also optically transparent polyamides. Optically transparent polyamides comprise microcrystalline polyamides comprising linear aliphatic dicarboxylic acids and cycloaliphatic diamines, amorphous polyamides comprising linear aliphatic dicarboxylic acids and cycloaliphatic diamines and optionally lactams and, respectively, aminocarboxylic acids and amorphous polyamides comprising terephthalic acid and cycloaliphatic or branched aliphatic diamines and optionally lactams and, respectively, aminocarboxylic acids or amorphous polyamides comprising isophthalic acid and cycloaliphatic or linear or branched aliphatic diamines and optionally lactams and, respectively, aminocarboxylic acids. Suitable optically transparent polyamides are by way of example amides made of dodecanedioic acid and of an isomer mixture of 4,4'-bis(aminocyclohexyl)methane, of terephthalic acid and of the isomer mixture of 2,2,4- and 2,4,4-trimethylhexamethylenediamine, of dodecanedioic acid and of the isomer mixture of 3,3'-dimethyl-4,4'-bis (aminocyclohexyl)methane, of laurolactam, isophthalic acid and of the isomer mixture of 3,3'-dimethyl-4,4'-bis(aminocyclohexyl)methane or of tetradecanedioic acid and of the isomer mixture of 3,3'-dimethyl-4,4'-bis(aminocyclohexyl) methane. Polyamides of this type are described by way of example in DE-A-102007062063 or WO-A-2008025729. Optically transparent polyamides are available by way of example with trade names Trogamid (Evonik Industries AG, Germany), Grilamid (EMS-Chemie, Germany), or Durethan (Lanxess, Germany).

Copolyamides

The copolyamide can be produced from amide monomers and from comonomers. The comonomers are preferably used to obtain copolyamides with a melting point from 95° C. to 175° C.

The amide monomers are preferably selected from the group consisting of laurolactam, aminoundecanoic acid and mixtures thereof. Particular preference is given to copolyamides based on laurolactam.

The comonomers are preferably selected from aliphatic or cycloaliphatic diamines, aliphatic or cycloaliphatic dicarboxylic acids, lactams and mixtures thereof. The comonomers preferably comprise, mutually independently, from 4 to 18 C atoms. Suitable dicarboxylic acids are by way of example adipic acid, sebacic acid and dodecanedioic acid. Suitable diamines are by way of example hexamethylenediamine, decamethylenediamine and dodecamethylenediamine. Lactams such as caprolactam can likewise be used as comonomer.

Preferred comonomers are caprolactam and a polymer made with adipic acid and hexamethylenediamine, preferably in a ratio by mass of 1:1.

An excess of amine groups in the diamines gives copolyamides having reactive amino end groups.

The amine numbers of the copolyamides are preferably from 75 to 400 mmol/kg.

The weight-average molar mass of the copolyamides is preferably in the range from 15 000 to 70 000 g/mol (measured by means of gel permeation chromatography (GPC) against a polystyrene standard). The relative solution viscosity is preferably from 1.2 to 1.8 (determined in accordance with ISO 307).

The copolyamides can be used in the compositions of the invention in solution, in dispersion or in powder form, preference being given here to the powder form. A suitable solvent is by way of example m-cresol.

The powder form can by way of example be obtained by milling, the grain diameter here with preference being <200 µm, more preferably <100 µm and with particular preference <70 µm (sieve analysis).

One preferred embodiment of the invention comprises at least one epoxy component and at least one blocked polyisocyanate, alongside the copolyamide.

The proportion present of the epoxy component is preferably 2.5 to 10% by weight, with preference from 4 to 6% by weight, based in each case on the total weight of the copolyamide.

The proportion of blocked polyisocyanate is preferably from 2.5 to 15% by weight, more preferably from 4 to 6% by weight, based in each case on the total weight of the copolyamide.

The epoxy index of the epoxy component is typically from 1 to 2 eq/kg. The epoxy equivalent weight of the epoxy resins used can be from 400 to 4000 g/mol, preferably from 700 to 3000 g/mol and with preference from 875 to 1000 g/mol (determined in accordance with SMS 2026).

The content of OH groups in suitable epoxy resins is preferably from 2000 to 4500 mmol/kg, with preference from 2300 to 4000 mmol/kg (method of SMS 2367).

Compounds based on diols or on polyols or dicarboxylic acids can by way of example be used as epoxy component, preference being given here to diols and particular preference being given here to corresponding phenol-diol derivatives. Very particularly preferred phenol-diol derivatives are bisphenols, in particular bisphenol A. The epoxy component is usually obtained by reaction with epichlorohydrin.

The density of suitable epoxy resins is from 1 to 1.3 kg/L, preferably from 1.15 to 1.25 kg/L (25° C.; determined in accordance with ASTM D792). The glass transition temperature (Tg) can be from 20° C. to 100° C., preferably from 25° C. to 90° C., with preference from 40° C. to 60° C. and with particular preference from 45 to 55° C. (determined in accordance with ASTM D3418). The melting range is usually in the range from 45° C. to 150° C. (in accordance with DIN 53181). Suitable epoxy resins are obtainable by way of example as EPIKOTE resin, for example EPIKOTE Resin 1001 or 1009 from Hexion Specialty Chemicals, Inc.

The copolyamide can moreover comprise hardeners such as dicyandiamide (DCD), preferably in proportions of from 3 to 6% by weight, based on the total weight of the epoxy resin. To accelerate curing, urea derivatives such as monuron or fenuron can be added, and it is thus possible to lower the curing temperatures and/or shorten the curing times.

The blocked polyisocyanate component can be aromatic, aliphatic or cycloaliphatic, preference being given here to aliphatic or cycloaliphatic polyisocyanates. Blocking agents for isocyanates such as oximes, phenols or caprolactam are known to the person skilled in the art. It is preferable that, for blocking purposes, the polyisocyanate component takes the form of uretdione. Typical examples are marketed as VESTAGON by Evonik Industries AG, Germany.

The adhesion promoter composition can comprise self-crosslinking or externally crosslinking binders (in relation to the term "Bindemittel" [Binders] cf. Römpp Lexikon Lacke und Druckfarben [Römpp's Encyclopaedia of Coating Materials and Printing Inks], Georg Thieme Verlag, Stuttgart, N.Y., 1998, Bindemittel, pp. 73 and 74). For the purposes of the present invention, the term "self-crosslinking" denotes the property of a binder of entering into crosslinking reactions with itself. Precondition for this is that complementary reactive functional groups are present in the binders and react with one another and thus lead to crosslinking. Or else the binders comprise reactive functional groups which react "with themselves". Binder systems described as externally crosslinking are in contrast those in which one type of the complementary reactive functional groups is present in the binder and the other type is present in a hardener or crosslinking agent. For additional information here, reference is made to Römpp Lexikon Lacke und Druckfarben [Römpp's Encyclopaedia of Coating Materials and Printing Inks], Georg Thieme Verlag, Stuttgart, N.Y., 1998, Härtung [Curing], pp. 274 to 276, in particular lower part of p. 275.

The adhesion promoter composition can moreover comprise electrically conductive substances selected from graphite, carbon black, zinc dust and mixtures of these substances, thus giving electrically conductive adhesion promoter compositions.

The hybrid components comprising coatings of electrically conductive adhesion promoter polymer compositions can be provided with a cathodic electrocoat (CEC). Residual adhesion of at least 20%, in comparison with adhesion prior to cathodic electrocoat application, can arise here when the compositions of the invention are used. Residual adhesion is usually at least 5 mPa to 30 mPa (determination method: see Examples). A total loss of adhesion can occur if an attempt is made to press the hybrid component made of fibre-composite materials and metal directly, or to use, as third component, an unmodified polyamide material as intermediate layer for the bond.

The adhesion promoter compositions can moreover comprise colourants, preferably pigments. Functional pigments such as corrosion-protection pigments can moreover be present.

Suitable copolyamides are available by way of example as VESTAMELT from Evonik Industries AG, Germany. Examples that may be mentioned are X1027-P1, X1038-P1, X1316 P1 and X1333-P1.

Other materials that can be present alongside the copolyamide are graft copolymers made of polyamine and of polyamide-forming monomers such as lactams and/or ωaminocarboxylic acids, as described in EP-A-1065236:

The concentration of amino groups in the graft copolymer is preferably in the range from 100 to 2500 mmol/kg.

Examples of substance classes that can be used as polyamine are the following:

polyvinylamines (Römpp Chemie Lexikon, [Römpp's Chemical Encyclopaedia] 9th Edn. Vol. 6, p. 4921, Georg Thieme Verlag Stuttgart 1992);
polyamines that are produced from alternating polyketones (DE-OS 196 54 058);
dendrimers, for example
 $((H_2N—(CH_2)_3)_2N—(CH_2)_3)_2—N(CH_2)_2—N((CH_2)_2—N((CH_2)_3—NH_2)_2)_2$ (DE-A-196 54 179) or
tris(2-aminoethyl)amine, N,N-bis(2-aminoethyl)-N',N'-bis[2-[bis(2-aminoethyl)amino]ethyl]-1,2-ethanediamine, 3,15-bis(2-aminoethyl)-6,12-[bis[2-[bis(2-aminoethyl)amino]ethyl]-9-[2-[bis[2-bis(2-aminoethyl)amino]ethyl]amino]ethyl]3,6,9,12,15-pentaazaheptadecane-1,17-diamine (J. M. Warakomski, Chem. Mat. 1992, 4, 1000-1004);
linear polyethyleneimines which can be produced by polymerization of 4,5-dihydro-1,3-oxazoles followed by hydrolysis (Houben-Weyl, Methoden der Organischen Chemie [Methods for Organic Chemistry], vol. E20, pp. 1482-1487, Georg Thieme Verlag Stuttgart, 1987);
branched polyethyleneimines which are obtainable by polymerization of aziridines (Houben-Weyl, Methoden der Organischen Chemie [Methods for Organic Chemistry], vol. E20, pp. 1482-1487, Georg Thieme Verlag Stuttgart, 1987) and which generally have the following amino group distribution:
from 25 to 46% of primary amino groups,
from 30 to 45% of secondary amino groups and
from 16 to 40% of tertiary amino groups;
polypropylenimines.

In the preferred case the number-average molar mass $M_n$ of the polyamine is at most 20 000 g/mol, particularly at most 10 000 g/mol and in particular at most 5000 g/mol (see above for method of determination).

Lactams and ω-aminocarboxylic acids which can be used as polyimide-forming monomers comprise from 4 to 19 carbon atoms, in particular from 6 to 12. It is particularly preferable to use ε-caprolactam and laurolactam or the relevant ω-aminocarboxylic acids. The molar ratio of C12 to C6 unit is preferably from 4:1 to 1:4. The ratio by mass of copolyamide to graft copolymer is preferably from 19:1 to 1:1.

In the simplest case, the functionalized polyolefin is polypropylene-based. However, ethylene/$C_3$-$C_{12}$-α-olefin copolymers are also suitable. An example of a $C_3$-$C_{12}$-α-olefin used is propene, 1-butene, 1-pentene, 1-hexene, 1-octene, 1-decene or 1-dodecene. The ethylene/$C_3$-$C_{12}$-α-olefin copolymers can moreover also comprise up to at most 10% by weight of dienes such as ethylidenenorbornene or 1,4-hexadiene. Functionalization is preferably provided by anhydride groups, these being introduced in a known manner through thermal or free-radical reactions of the main-chain polymer with an unsaturated dicarboxylic anhydride or with an unsaturated dicarboxylic acid. Examples of suitable reagents are maleic anhydride and itaconic anhydride. The quantity grafted onto the material in this method is from 0.1 to 4% by weight, based on the total weight of the functionalized polyolefins, and another monomer such as styrene can also be used here.

Maleic-acid-grafted polyolefins are widely used for industrial applications, in particular for impact modifications or as compatibilizers in blends and mechanically reinforced systems (Polymer, 2001, 42, 3649-3655 and literature cited). The source mentioned also describes by way of example the production of functionalized polyolefins of this type.

A typical functionalized polyolefin is the polypropylene-based, anhydride-grafted material Admer QB 520 E (Mitsui Chemicals). It is also possible in principle to use maleic-acid-grafted polypropylenes from Kometra (e.g. SCONA TPPP 8012), these being more free-flowing.

Another possible functionalization method consists in the mixing, in the melt, of unfunctionalized polyolefins with reactive compatibilizers which comprise epoxy or carboxylic anhydride groups. Typical examples are copolymers composed of ethylene and of one or more unreactive acrylic monomers with maleic anhydride or glycidyl methacrylate.

Lotader AX8900 (Arkema) is a typical representative material having glycidyl methacrylate units.

The ratio of polyamide component to polyolefin component is preferably from 9:1 to 2:3. The copolyamide described above can function as hot-melt adhesive.

Polyaryl Ether Ketones

The polyaryl ether ketones as polymers of the composition of the invention are known in the prior art. They can be characterized by the following general structure (IV):

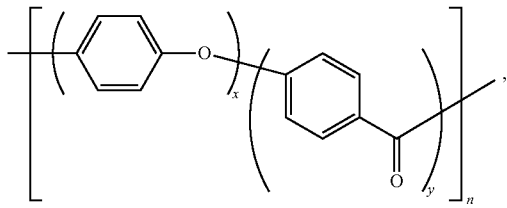

where the indices x and y can mutually independently assume values from 1 to 10.

Particular preference is given to polyether ether ketone (PEEK) where $x=2$ and $y=1$.

The number-average molecular weight of the polyaryl ether ketones of the formula (IV) is preferably from 10 000 to 30 000. The molecular weight is determined by means of gel permeation chromatography (GPC) against a styrene calibration standard. The sample is prepared with 5 g/L content in tetrahydrofuran at 23° C. Column: styrene-divinylbenzene copolymer; mobile phase: tetrahydrofuran; flow rate: 1 mL/min; detection: refractive index; internal standard: ethylbenzene.

Fibre Reinforcement

The fibres can have orientation in the matrix or no orientation, preferably having orientation. Examples of fibre-composite materials comprising oriented fibres are UD laid scrims, UD tapes (UD=unidirectional) and woven fabrics. Unoriented fibres are present by way of example in nonwovens.

The fibre-plastic composites can moreover take the form of semifinished fibre-matrix products. These can have been preimpregnated. The preimpregnated semifinished fibre-matrix products can take the form of sheets, of strips or of strands.

Among the semifinished thermoplastic products are by way of example glass-mat-reinforced thermoplastics (GMT), short- or long-fibre-reinforced thermoplastics (SFT or LFT) and thermoplastic preimpregnated fibres (prepregs). Thermoplastic prepregs in the form of sheets are also called organopanels (cf. Tagungsband zur Fachtagung "Thermoplastische Faserverbundkunststoffe" [Proceedings of the Conference on "Thermoplastic Fibre-composite materials"], 15-16 May 2013 in Fürth, Carl Hanser Verlag Munich 2013, ISBN 978-3-446-43864-4, pp. 5, 13 and 17).

The fibre-composite material can be subjected to a trimming or forming process. The forming process can take place before or after application of the composition.

The person skilled in the art is aware of the production of fibre-composite materials made of the fibres described above and of the matrix.

Metals

Examples of suitable metals are iron-containing alloys such as steel, aluminium, copper, magnesium, titanium, and also alloys of the abovementioned metals. Preferred metals are steel, titanium, aluminium, and also alloys of the abovementioned metals, particular preference being given to steel and aluminium, and aluminium alloys. The metals can also take the form of foam or can be present in a honeycomb structure.

Preferred steels are unalloyed steels and stainless steels. Steels with a protective coating are particularly preferred. Suitable coatings are by way of example coatings made of zinc, aluminium-silicon, aluminium-zinc, zinc-aluminium, zinc-iron or zinc-magnesium, preference being given here to aluminium-silicon, zinc-aluminium and zinc. The composition of the coatings is defined by way of example in the brochure "Schmelztauchveredeltes Band and Blech" [Hot-dip-coated Strip and Sheet] of the Steel Information Centre in the Stahl-Zentrum, Düsseldorf, Germany, 2010 Edition.

Before the application of the fibre-composite material, optionally comprising the additive, the metal can be subjected to a trimming or forming process.

The forming process for the metal can take place before or after the application of the composition.

The invention further provides a metal substrate coated with at least one composition of the invention. The substrate can by way of example be a semifinished metallic product or a metallic moulding. It is preferable that the substrate is a metal strip, a metal panel, a metal profile, a cast metal part or a metal wire.

Before application of the compositions, mechanical roughening of the surface can take place by way of example by means of grinding, brushing or sandblasting.

Before application of the compositions, it is possible to apply a conversion coat to all or some of the surface of the metal, in order to pretreat the surface. The metal can be cleaned before the pretreatment, or can already have metallic protective coatings. The metal cleaning process is known to the person skilled in the art.

The roughening and the conversion process can be combined with one another.

The pretreatment can use converting agents. The converting agents are usually used in the form of aqueous solutions. Converting agents that can be used are commercially available passivating agents and products for conversion treatment, for example zinc phosphating agents, iron phosphating agents, and also phosphoric acid solutions comprising titanates or zirconates. From a technical point of view it is likewise possible to use chromating agents, but these are less preferred because they are hazardous to health.

It is moreover possible to obtain the conversion coat by flame-pyrolytic deposition of amorphous silicate on the surface of the metal. The surface to be treated is passed through the oxidizing region of a gas flame into which a silicon-containing substance, the precursor, has been dosed. This is consumed by combustion, and the residue deposits in the form of amorphous silicate as firmly adhering layer in layer thicknesses of about 20 to 40 nm on the surface.

Treatment of a surface is achieved by using an operating gas to produce a plasma jet or a combustion gas to produce a flame jet, this being used to coat the surface, where at least one precursor material is introduced into the operating gas and/or into the plasma jet or into the combustion gas and/or into the flame jet, and is reacted in the plasma jet or flame jet, where at least one reaction product of at least one of the precursors is deposited on the surface and/or on at least one layer arranged on the surface. A process of this type is described by way of example in DE-A-102009042103.

To the extent that the metal surface has a silicate surface, obtained by way of example by pyrolytic deposition of amorphous silicate in a flame, preference is given to an additive comprising the moiety of the formula (II) or (IV) or a mixture of the moieties (III) and (IV), particular preference being given to a mixture of the moieties (III) and (IV).

In the case of a phosphatized metal surface, preference is given to additives having the moieties (II) or (III) or a mixture of the moieties (III) and (IV), particular preference being given to (II) or a mixture of the moieties (III) and (IV).

In the case of chromatized metal surfaces, preference is given to additives having the moiety (II) or (IV) or a mixture of the moieties (III) and (IV), particular preference being given to the moiety (II) or a mixture of the moieties (III) and (IV).

EXAMPLES

Where data are provided in % below, unless otherwise stated these are data in % by weight. In the case of compositions, unless otherwise stated the % data are based on the entire composition. Where average values are stated below, unless otherwise stated these are mass averages (weight averages). Where measured values are stated below, unless otherwise stated these measured values were determined at a pressure of 101 325 Pa and at a temperature of 25° C.

Adhesion-Promoting Additives

Adhesion-promoting additives of the formula (I)

$$M_a M'_b D_c D'_d \quad (I)$$

where R=methyl, were used in an extruder.

TABLE 1

Additives according to formula (I) used

| | a | b | c | d | R' |
|---|---|---|---|---|---|
| OMS 1 | 0 | 2 | 18 | 0 | II |
| OMS 2 | 2 | 0 | 89 | 7 | II |
| OMS 3 | 2 | 0 | 43 | 5 | II |
| OMS 4 | 2 | 0 | 73 | 25 | II |
| OMS 5 | 0 | 2 | 16 | 2 | II |
| OMS 6 | 0 | 2 | 18 | 0 | III |
| OMS 7 | 0 | 2 | 18 | 0 | IV |
| OMS 8 | 0 | 2 | 16 | 2 | III, IV |
| OMS 9 | 2 | 0 | 73 | 25 | III |
| OMS 10 | 2 | 0 | 73 | 25 | IV |
| OMS 11 | 2 | 0 | 100 | 20 | III |
| OMS 12 | 2 | 0 | 40 | 10 | III, IV |

The compounds OMS 8 and OMS 12 have the moieties III and IV in a molar ratio of 1:1. In OMS 8 the moiety III is present in formula constituent M', and the moiety IV is present in constituent D' of the formula (I).

General Specification for the Production of the Polymer Compositions

During the production of the polymer compositions the additives were either directly incorporated into the polyamides via liquid feed or introduced in solid form as masterbatch.

In the case of liquid feed (e.g. from Movacolor, NL) the additives were homogeneously incorporated by mixing within the first third of the extrusion unit (from 0.5 to 20% by weight, based on the total weight of the polymer composition). In the case of high-viscosity additives a pump with heatable supply line and heatable feed vessel was used if required.

Alternatively, 50% masterbatches of the additives in polyamide were produced. A separate feeder was used to feed the masterbatches into the main intake of the extrusion unit, where the appropriate polyamide was also introduced. "MB" indicates the additives where masterbatches were used.

The temperature profile in the extruder corresponded to that recommended by the producer of the appropriate polyamide. The polyamides were optionally predried if moisture content was above 0.1% by weight. The machine output rate for processing of the polymer compositions depended on the percentage of the additive and the viscosity thereof, and on the polymer used, and were from 3 to 10 kg per hour.

The quality of dispersion of the additives of the invention in the polyamides was assessed directly from the appearance of the strand on discharge from the extruder head. Homogeneous dispersion of the additive in the polyamide was assumed if the strand was homogeneous, comprised no bubbles and did not break off, and the thickness of the strand did not vary by more than 20%. This condition is characterized as "OK" in the embodiments below; where there is no entry in the Tables, this means that those compositions were not produced.

The following polymer compositions were used, based on the following polyamides (PA):

Polyamide 1—PA 612 Vestamid DX 9300 (Evonik Industries AG, DE)
Polyamide 2—PA 12 Vestamid L1901 (Evonik Industries AG, DE)
Polyamide 3—PA 1010 Vestamid Terra DS 18 (Evonik Industries AG, DE)
Polyamide 4—PACM Trogamid CX 7323 (Evonik Industries AG, DE)
Polyamide 5—PPA Vestamid HTPlusM3000 (Evonik Industries AG, DE)
Polyamide 6—PA 6 Durethan B 30S (Lanxess AG, DE)
Polyamide 7—PA 66 Durethan A30S (Lanxess AG, DE)

TABLE 2a

Polymer compositions produced with liquid feed of the additive

| Composition | 0.5% | 1% | 2% | 4% | 10% | 18% |
|---|---|---|---|---|---|---|
| PA1/OMS 1 | OK | OK | OK | OK | OK | OK |
| PA1/OMS 2 | OK | OK | OK | OK | OK | OK |
| PA1/OMS 3 | OK | | OK | OK | OK | |
| PA1/OMS 4 | OK | | OK | OK | OK | |
| PA1/OMS 5 | OK | | OK | OK | OK | |
| PA1/OMS 6 | OK | OK | OK | OK | OK | OK |
| PA1/OMS 7 | OK | | | | OK | |
| PA1/OMS 8 | OK | | | | OK | |
| PA1/OMS 9 | OK | | | | OK | |
| PA1/OMS 10 | OK | | | | OK | |
| PA1/OMS 11 | OK | | | | OK | |
| PA1/OMS 12 | OK | | | | OK | |
| PA2/OMS 4 | OK | | OK | | OK | |
| PA2/OMS 7 | OK | | OK | | OK | |
| PA2/OMS 8 | OK | | OK | | OK | |
| PA2/OMS 9 | OK | | OK | | OK | |
| PA2/OMS 10 | OK | | OK | | OK | |
| PA3/OMS 4 | OK | | OK | | OK | |
| PA3/OMS 8 | OK | | OK | | OK | |
| PA3/OMS 12 | OK | | OK | | OK | |
| PA4/OMS 4 | OK | | OK | | OK | |
| PA4/OMS 8 | OK | | OK | | OK | |
| PA4/OMS 11 | OK | | OK | | OK | |
| PA5/OMS 4 | OK | | OK | | OK | |
| PA5/OMS 8 | OK | | OK | | OK | |
| PA5/OMS 12 | OK | | OK | | OK | |
| PA6/OMS 1 | OK | | OK | | OK | |
| PA6/OMS 4 | OK | | OK | | OK | |
| PA6/OMS 12 | OK | | OK | | OK | |
| PA7/OMS 1 | OK | | OK | | OK | |
| PA7/OMS 4 | OK | | OK | | OK | |
| PA7/OMS 12 | OK | | OK | | OK | |

TABLE 2b

Polymer compositions produced with use of 50% masterbatches
(MB) of the additives in the appropriate polymers

| Composition | 2% | 4% | 6% | 8% | 10% |
|---|---|---|---|---|---|
| PA1/OMS MB 1 | OK | OK | OK | OK | OK |
| PA1/OMS MB 2 | OK | OK | OK | OK | OK |
| PA1/OMS MB 3 |    | OK |    | OK |    |
| PA1/OMS MB 4 |    | OK |    | OK |    |
| PA1/OMS MB 5 |    | OK |    | OK |    |
| PA2/OMS MB 4 |    |    |    |    | OK |
| PA2/OMS MB 8 |    |    |    |    | OK |
| PA2/OMS MB 6 |    |    |    |    | OK |
| PA2/OMS MB 10 |   |    |    |    | OK |
| PA2/OMS MB 12 |   |    |    |    | OK |

All of the polymer compositions prepared complied with the quality criteria mentioned and were therefore designated "OK" because they were suitable for further processing to give foils or powder, or else to give compounded material for direct overmoulding.

Foil Production from the Polymer Compositions of the Invention

Foils were produced by the casting process, these therefore being what are known as cast films with thickness from 50 to 600 μm (cast film system from Collin). The quality of the foils was assessed via measurement and comparison of thickness in various regions of the foil, and thickness variation of less than 15% was designated OK in the usage examples below.

Thickness was determined at five randomly selected locations on a sample measuring 30 cm by 30 cm from the centre of the material, by using a digital calliper screw gauge from Mitutoyo with closure force from 7 to 9 Newtons.

There is no requirement that the resultant foil made of the polymer composition be transparent; it can be opaque.

TABLE 3

Foils—polymer composition and thickness

| | Foil thickness in μm | | | | | |
|---|---|---|---|---|---|---|
| Polymer composition | 50 | 100 | 150 | 250 | 400 | 600 |
| PA2/0.5% OMS 4 | OK | OK | OK | OK | OK |    |
| PA2/2% OMS 4 | OK | OK | OK | OK | OK | OK |
| PA2/4% OMS 4 | OK | OK | OK | OK | OK |    |
| PA2/10% OMS 4 | OK | OK | OK | OK |    |    |
| PA3/0.5% OMS 4 | OK | OK | OK | OK | OK | OK |
| PA3/2% OMS 4 | OK | OK | OK | OK | OK | OK |
| PA3/4% OMS 4 | OK | OK | OK | OK | OK |    |
| PA3/10% OMS 4 | OK | OK | OK | OK | OK |    |
| PA2/10% OMS 4 MB | OK | OK | OK | OK | OK | OK |
| PA2/10% OMS 8 MB | OK | OK | OK | OK |    |    |
| PA6/2% OMS1 | OK | OK | OK | OK |    |    |
| PA6/2% OMS 4 | OK | OK | OK | OK |    |    |
| PA6/2% OMS12 | OK | OK | OK | OK |    |    |

Absence of values indicates that those foils were not studied. It can be seen that all of the foils prepared complied with the quality criteria mentioned.

Production of a Semifinished Fibre-Composite Product Based on a Foil

The foils manufactured were further processed to give semifinished fibre-composite products by the film-stacking process or direct melt process.

The design of the system for carrying out the two processes comprises units for introduction of material, an interval press unit with impregnation and bonding unit, and also a downstream roll mill and a downstream finishing unit. The unit for introducing material includes roll holders for the individual polyamide foils used in the respective processes, and for semifinished textile products such as woven fabrics or laid scrims. In the case of the direct melt process there is also a plastifying unit present for direct impregnation with plastics melts. The impregnation and bonding unit in which the foils, semifinished textile products, and optionally melts are brought together is prescribed by the interval press unit. Systems of this type are well known, see by way of example publications from Neue Materialien Fürth GmbH.

The properties of the semifinished fibre-composite products can be characterized in the three-point bending test. By way of example, the following polymer compositions of the invention in the form of a foil of thickness 150 μm, used as modified edge foil 44, are used to produce semifinished fibre-composite products with GF and CF mats of the type obtainable inter alia from Lange and Ritter. Alternating layer build-up is used here, the respective remaining polymer layers/foil layers being the polymer without additive of the formula (I). Once build-up of the layers has been concluded, the materials are pressed (with use of a press from Gibitre, the mould being kept closed for 3 minutes, using a pressure of 20 bar at a temperature of 260° C.). After the semifinished fibre-composite parts have been stored for seven days under standard conditions of temperature and humidity, the samples are subjected to a three-point bending test. The Table below characterizes GF-based semifinished products as "OK" if their tensile strength is more than 300 MPa, and characterizes CF-based semifinished products as "OK" if their tensile strength is more than 500 MPa.

Material 1: woven glass fabric 92140—FK 800 390
Material 2: woven glass fabric 92125—FK 800 280
Material 3: woven glass fabric 92110—FK 800 163
Material 4: woven carbon-fibre fabric 02C160K—4×4 threads
Material 5: woven carbon-fibre fabric 02C245K—6×6 threads Materials 1-5 are obtainable from Lange+ Ritter GmbH, DE
PA2 was used for the layers which do not function as edge foil.

TABLE 4

Tensile strength of foil-based semifinished fibre-composite products

| Edge foil 44 | GF | Three-point bending test | CF | Three-point bending test |
|---|---|---|---|---|
| PA2/2% OMS 4 | Material 1 | OK | Material 4 | OK |
| PA2/4% OMS 4 | Material 1 | OK | Material 4 | OK |
| PA3/2% OMS 4 | Material 1 | OK | Material 4 | OK |
| PA3/4% OMS 4 | Material 1 | OK | Material 4 | OK |
| PA2/2% OMS 4 | Material 2 | OK | Material 5 | OK |
| PA2/4% OMS 4 | Material 2 | OK | Material 5 | OK |
| PA3/2% OMS 4 | Material 2 | OK | Material 5 | OK |
| PA3/4% OMS 4 | Material 2 | OK | Material 5 | OK |
| PA2/2% OMS 4 | Material 3 | OK | | |
| PA2/4% OMS 4 | Material 3 | OK | | |
| PA2/2% OMS 4 | Material 3 | OK | | |
| PA2/4% OMS 4 | Material 3 | OK | | |

Production Process for Hybrid Components

Embodiments of hybrid components are described below. Bond strengths between metal and semifinished fibre-composite product are determined after bonding of these two parts via use of a polymer composition of the invention in the form of a foil or in the form of powder of the said polymer composition with fineness 99.5% finer than 100 micrometers. Adhesion here is measured in the tensile test 24 h after production.

Production of the composite is described here. The metal substrate (substrate 1) is placed on a level area. A foil with area 2.5 cm×7.5 cm is cut out and placed flush at one end of the metal, the overall length of which is 20 cm. Alternatively, 100 micrometer powder can be used instead of the foil, and in that case a quantity which leads to the desired thickness is scattered onto the abovementioned area. The area here is covered with a mask in such a way that the precise area is covered with the correct weight. The second substrate (substrate 2) is then placed onto the material in such a way that substrate 2 terminates precisely on the edge of the foil or of the powder in the substrate-1 area 7.5 cm distant from the edge. Since substrate 2, measuring 20 cm, then likewise projects by 12.5 cm, one of the jaws of the Zwick machine can clamp the metal substrate 1 in a tensile test, while the other jaw clamps the substrate 2.

The force in the tensile test is measured. Values in the Table here are averages of 3 determinations.

Various commercially available metals were used, these being the following products obtainable from Rocholl GmbH, DE:
Metal 1 Test Steel DC04 1.5 mm
Metal 2 Hot-dip galvanized Test Steel from DOW
Metal 3 Steel DC01ZN140+SiO2
Metal 4 Steel DC01ZN140+SiO2+HV
Metal 5 Steel DC01 ZE 25/25 (electro galvanized)
Metal 6 Steel DX 51S+Z275 (hot-dip galvanized)
Metal 7 Aluminium EN-AW 5754+SiO$_2$
Metal 8 Aluminium EN-AW 5754+SiO$_2$+HV
Metal 9 Aluminium AW 5754+Alodine 1227 (chromated)
Metal 10 Steel DC 4

Suffix "SiO$_2$": surface silicatized by means of pyrolytic deposition in a flame (Pyrosil process from Sura, DE).

Suffix "HV": modified aminosilane from Sura, DE, as adhesion promoter.

The semifinished fibre product used is a Tepex® dynalite 102-RG600(x)/47% roving from Lanxess/Bond Laminates, DE. Materials with 2% by weight of additive of the formula (I) were used in order to illustrate by way of example the strengths that can be achieved.

TABLE 5

Tensile strength of hybrid components

| Metal | Polymer composition | Tensile strength in MPa |
|---|---|---|
| 1 | PA1 | n.d. |
| 3 | PA1 | n.d. |
| 7 | PA1 | n.d. |
| 1 | PA1/OMS 2 as powder | 62 |
| 2 | PA1/OMS 2 as powder | 54 |
| 3 | PA1/OMS 2 as powder | 49 |
| 4 | PA1/OMS 2 as powder | 57 |
| 5 | PA1/OMS 2 as powder | 65 |
| 6 | PA1/OMS 2 as powder | 52 |
| 7 | PA1/OMS 2 as powder | 51 |
| 8 | PA1/OMS 2 as powder | 65 |
| 9 | PA1/OMS 2 as powder | 78 |
| 10 | PA1/OMS 2 as powder | 62 |
| 9 | PA1/OMS 9 as powder | 56 |
| 9 | PA1/OMS 10 as powder | 72 |
| 9 | PA1/OMS 8 as powder | 61 |
| 3 | PA1/OMS 9 as powder | 62 |
| 3 | PA1/OMS 10 as powder | 75 |
| 3 | PA1/OMS 8 as powder | 58 |

TABLE 5-continued

Tensile strength of hybrid components

| Metal | Polymer composition | Tensile strength in MPa |
|---|---|---|
| 7 | PA1/OMS 9 as powder | 48 |
| 7 | PA1/OMS 10 as powder | 57 |
| 7 | PA1/OMS 8 as powder | 51 |
| 1 | PA3 | 122 |
| 9 | PA3 | 115 |
| 1 | PA3/OMS 4 as powder | 165 |
| 1 | PA3/OMS 8 as powder | 161 |
| 1 | PA3/OMS 12 as powder | 154 |
| 3 | PA3/OMS 4 as powder | 152 |
| 3 | PA3/OMS 8 as powder | 165 |
| 3 | PA3/OMS 12 as powder | 167 |
| 7 | PA3/OMS 4 as powder | 148 |
| 7 | PA3/OMS 8 as powder | 161 |
| 7 | PA3/OMS 12 as powder | 171 |
| 9 | PA3/OMS 4 as powder | 185 |
| 9 | PA3/OMS 8 as powder | 160 |
| 9 | PA3/OMS 12 as powder | 164 |
| 1 | PA6/OMS 1 as foil | 54 |
| 1 | PA6/OMS 4 as foil | 63 |
| 1 | PA6/OMS 12 as foil | 77 |
| 10 | PA6/OMS 1 as foil | 59 |
| 10 | PA6/OMS 4 as foil | 73 |
| 10 | PA6/OMS 12 as foil | 65 |

The abbreviation "n.d." in the Table above means that no strength values can be determined because when the hybrid component is removed from the press it exhibits no adhesion, and no tensile strength test can therefore be carried out.

The invention claimed is:

1. A polymer composition, comprising:
   a) from 50 to 99.7% by weight of at least one polymer having a molecular weight of 15,000 to 70,000 selected from the group consisting of polyamides, polyaryl ether ketones, and mixtures thereof, and
   b) from 0.3 to 20% by weight of one or more additives of the formula (I):

$$M_a M'_b D_c D'_d \quad (I)$$

wherein
$M=[R_3SiO_{1/2}]$
$M'=[R'R_2SiO_{1/2}]$
$D=[R_2SiO_{2/2}]$,
$D'=[R'RSiO_{2/2}]$
wherein each R is independently selected from the group consisting of H, alkyl moieties having from 1 to 12 C atoms and a phenyl moiety, and each R' is independently a moiety having a structure of formula (II), formula (III) or formula (IV),
wherein formula (II) is an alkylamino moiety

wherein x=from 1 to 20 and R" is selected from the group consisting of H and an alkyl moiety having from 1 to 12 C atoms,
formula (III) is a (trialkoxysilyl)methylene moiety

wherein R''' is an alkyl moiety having from 1 to 4 C atoms,
and formula (IV) is an epoxycyclohexylalkyl moiety

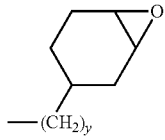

wherein y=from 1 to 4,
wherein the indices are
a=from 0 to 2
b=from 0 to 2
c=from 10 to 500
d=from 0 to 50
a+b=2 and
b+d≥2, and
wherein the proportions of all constituents of the composition give a total of 100% by weight.

2. The polymer composition according to claim 1, wherein each R is independently methyl or phenyl.

3. The polymer composition according to claim 1, wherein the ratio of the sum of the indices a+c to the sum of the indices b+d, (a+c)/(b+d), is from 2 to 50.

4. The polymer composition according to claim 1, wherein the index c is from 15 to 100.

5. The polymer composition according to claim 1, wherein
(i) b=2, and the index d is from 0 to 20 or
(ii) b=0, and the index d is from 2 to 20.

6. The polymer composition according to claim 1, wherein the polymer composition comprises from 0.5 to 10% by weight of the additive of the formula (I).

7. The polymer composition according to claim 1, wherein the polyamide is present and is selected from the group consisting of homopolyamides of an aminocarboxylic acid, homopolyamides of a diamine-dicarboxylic acid, copolyamides and mixtures thereof.

8. The polymer composition according to claim 7, wherein the polyamide is selected from the group consisting of nylon-6, nylon-6,6, nylon-6,10, nylon-6,12, nylon-10,10, nylon-12 and mixtures thereof.

9. A hybrid component, comprising:
a metal, and
the polymer composition according to claim 1.

10. The hybrid component according to claim 9, further comprising:
at least one additional adhesion promoter polymer composition layer located between the metal and the polymer composition.

11. A foil, comprising:
the polymer composition according to claim 1,
wherein the average thickness of the foil is from 10 μm to 600 μm.

12. The foil according to claim 11, further comprising:
at least one increased concentration zone
wherein the increased concentration zone comprises at least one region at a surface of the foil which has an increased concentration of the additive of the formula (I) relative to the bulk concentration of the additive of the formula (I).

13. A semifinished plastics product, comprising:
at least one polymer as a plastics material selected from the group consisting of polyamides, polyaryl ether ketones, and mixtures thereof,
wherein at least one part of a surface of the plastics material comprises a coating, the coating comprising at least one polymer composition according to claim 1.

14. A process for the production of a semifinished plastics product, the process comprising:
applying at least one layer of the polymer composition according to claim 1 to a plastics material selected from the group consisting of polyamides, polyaryl ketones, and mixtures thereof thereby coating at least one part of a surface of the plastics material with a coating comprising at least one polymer composition according to claim 1.

15. A hybrid component, comprising:
a metal, and the semifinished plastics product according to claim 13.

16. The polymer composition according to claim 1, wherein the index c is from 20 to 50.

17. The polymer composition according to claim 1, wherein
(i) b=2, and the index d is from 1 to 10, or
(ii) b=0, and the index d is from 2 to 20.

18. The polymer composition according to claim 1, wherein
(iii) b=2, and the index d is from 0 to 20, or
(iv) b=0, and the index d is from 3 to 10.

19. The polymer composition according to claim 1, wherein
(v) b=2, and the index d is from 1 to 10, or
(vi) b=0, and the index d is from 3 to 10.

20. The hybrid component according to claim 15, which has an adhesion as measured in the tensile test 24 hours after production of 48-185 MPa.

21. The polymer composition according to claim 1, wherein said polymer is a polyamide.

22. The polymer composition according to claim 21, wherein said polyamide is a copolyamide.

* * * * *